(12) United States Patent
Potts

(10) Patent No.: US 10,930,177 B2
(45) Date of Patent: Feb. 23, 2021

(54) INTERACTIVE GLOBE

(71) Applicant: LeapFrog Enterprises, Inc., Emeryville, CA (US)

(72) Inventor: Alex Potts, Emeryville, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 380 days.

(21) Appl. No.: 15/981,781

(22) Filed: May 16, 2018

(65) Prior Publication Data
US 2019/0355282 A1   Nov. 21, 2019

(51) Int. Cl.
G09B 27/08   (2006.01)
G06F 3/0354   (2013.01)
G06F 3/0484   (2013.01)

(52) U.S. Cl.
CPC ......... *G09B 27/08* (2013.01); *G06F 3/03545* (2013.01); *G06F 3/04847* (2013.01)

(58) Field of Classification Search
CPC .................................................. G09B 27/08
USPC .......................... 434/131, 136, 145, 146, 153
See application file for complete search history.

(56) References Cited

U.S. PATENT DOCUMENTS

| | | | |
|---|---|---|---|
| 812,408 A | 2/1906 | Dickerson | |
| D185,370 S | 6/1959 | Kimosian | |
| 3,197,893 A | 8/1965 | Anthony | |
| 4,451,874 A * | 5/1984 | Friedman | G01C 21/22 362/285 |
| 4,477,193 A * | 10/1984 | Yasufuku | G04B 19/226 368/23 |
| 4,494,935 A | 1/1985 | Miller | |
| D281,983 S | 12/1985 | Yasufuku | |

(Continued)

FOREIGN PATENT DOCUMENTS

| | | |
|---|---|---|
| CN | 300785117 | 5/2008 |
| CN | 101847338 | 9/2010 |

(Continued)

OTHER PUBLICATIONS

Ex Parte Quayle Action for U.S. Appl. No. 29/647,919, mailed Oct. 18, 2019, 7 pages.

(Continued)

*Primary Examiner* — Kurt Fernstrom
(74) *Attorney, Agent, or Firm* — Kilpatrick Townsend & Stockton LLP

(57) ABSTRACT

An interactive globe device may include a base, a spherical globe rotatable around an axle mounted to the base, and a stylus for selecting locations on the spherical globe. The base may include an integrated display, and control buttons for switching the operating mode of the interactive globe device. The spherical globe may have dot patterns printed on its surface, and the stylus may include an optical sensor configured to detect the dot patterns on the spherical globe as locations being selected by the user. The interactive globe device may also include a processor to dynamically adjust mapping of the dot patterns into different regions based on the operating mode of the interactive globe device, determine which of the regions for the operating mode corresponds to a dot pattern detected by the stylus, and render interactive content on the integrated display based on the determined region.

20 Claims, 5 Drawing Sheets

(56) References Cited

U.S. PATENT DOCUMENTS

| | | | |
|---|---|---|---|
| 5,057,024 A * | 10/1991 | Sprott | G09B 27/08 362/809 |
| 5,132,943 A * | 7/1992 | Davies | G04B 19/226 368/21 |
| 5,519,809 A | 5/1996 | Husseiny et al. | |
| D387,805 S | 12/1997 | Hsu | |
| 5,839,902 A | 11/1998 | Wood | |
| 5,877,458 A | 3/1999 | Flowers | |
| D407,747 S | 4/1999 | Liu | |
| 5,931,677 A * | 8/1999 | Rifat | G09B 27/08 273/237 |
| 5,945,985 A | 8/1999 | Babin et al. | |
| D417,466 S | 12/1999 | Ho | |
| 6,299,451 B1 | 10/2001 | Davila | |
| 6,527,555 B1 * | 3/2003 | Storm | G09B 27/08 434/130 |
| RE38,286 E | 10/2003 | Flowers | |
| 6,773,262 B1 * | 8/2004 | Blum | G09B 27/00 434/130 |
| 6,843,655 B1 | 1/2005 | Duprey | |
| 6,979,197 B2 * | 12/2005 | Cho | G09B 27/06 434/136 |
| 6,985,139 B2 | 1/2006 | Marggraff et al. | |
| D531,671 S | 11/2006 | Chan | |
| 7,201,402 B2 | 4/2007 | Duprey | |
| D547,376 S | 7/2007 | Pachler | |
| 7,255,563 B2 | 8/2007 | Duprey | |
| 7,567,242 B2 | 7/2009 | Perkins et al. | |
| 7,801,495 B2 | 9/2010 | Tischer et al. | |
| 7,936,339 B2 | 5/2011 | Marggraff et al. | |
| 8,082,271 B2 * | 12/2011 | Chan | G09B 5/06 707/781 |
| 8,398,080 B2 | 3/2013 | Stolten | |
| 9,064,288 B2 | 6/2015 | Abhyanker | |
| 9,520,069 B2 | 12/2016 | Wood et al. | |
| 9,640,083 B1 | 5/2017 | Wood et al. | |
| D847,257 S | 4/2019 | Phang et al. | |
| 10,565,798 B2 * | 2/2020 | Goyal | G09B 27/08 |
| 2004/0229195 A1 | 11/2004 | Marggraff et al. | |
| 2008/0160492 A1 * | 7/2008 | Campbell | G09B 19/00 434/379 |
| 2009/0104590 A1 * | 4/2009 | Yang | G09B 19/04 434/317 |
| 2009/0155749 A1 * | 6/2009 | Cogliano | G09B 19/0061 434/145 |

FOREIGN PATENT DOCUMENTS

| | | |
|---|---|---|
| CN | 305018091 | 1/2019 |
| CN | 305131970 S | 4/2019 |
| EM | 005824497-0001 | 11/2018 |
| EP | 2148310 | 1/2010 |
| JP | D1391318 | 6/2010 |

OTHER PUBLICATIONS

Extended European Search report for EP Application No. EP19174741.9, dated Oct. 8, 2019, 7 pages.

"VTech Light and Flight Discovery Globe Amazon Exclusive", Amazon, Available Online at, https://www.amazon.com/VTech-Flight-Discovery-Amazon-Exclusive/dp/B071ZJ21SV/ref=pd_rhf_se_s_cr_simh_1_7/146-7298353-1229266?_encod%E2%80%A6, 10 pages.

* cited by examiner

INTERACTIVE GLOBE

BACKGROUND

Educational globes provide a useful tool to learn about geography and the world around us. Such globes may have a rotatable sphere mounted on a base. A world map can be disposed on the sphere, and a user can rotate the sphere to view different locations of the world map. Some globes may provide a touch-sensitive surface to play audio content in response to a user touching the world map on the sphere. For example, when a user touches a particular country, the globe may play an audio clip describing certain facts or characteristics of that country. However, the amount of information conveyed by audio content alone can be limited. For example, describing the architecture of a building in words is usually insufficient to paint an accurate picture of how the structure looks in real life. Furthermore, the touch-sensitive surface of the globe is typically implemented using capacitive sensors. Providing such sensors on a spherical surface can be difficult to manufacture, and the accuracy of the sensors can be limited by the curvature of the sphere.

Embodiments of the present invention address these and other problems individually and collectively.

BRIEF SUMMARY

According to some embodiments, an interactive globe device may include a base, a spherical globe rotatable around an axle mounted to the base, and a stylus for selecting locations on the spherical globe. The base may include an integrated display, and one or more control buttons for switching the operating mode of the interactive globe device. The spherical globe may have dot patterns printed on its surface, and the stylus may include an optical sensor configured to detect the dot patterns on the spherical globe as locations being selected by the user. The interactive globe device may also include a processor configured to dynamically adjust mapping of the dot patterns into different regions based on the operating mode of the interactive globe device, determine which of the regions for the operating mode corresponds to a dot pattern detected by the stylus, and render interactive content on the integrated display based on the determined region.

According to some embodiments, a method for providing content on an interactive globe device may include receiving input to operate the interactive globe device in a first mode of operation, mapping dot patterns printed on the spherical globe into a first plurality of regions for the first mode of operation, and rendering, on an integrated display on the base, first interactive content associated with a first region of the first plurality of regions in response to detecting selection of a first dot pattern on the spherical globe that is mapped to the first region in the first mode of operation. The method may also include receiving input to operate the interactive globe device in a second mode of operation, dynamically remapping the dot patterns printed on the spherical globe into a second plurality of regions for the second mode of operation, and rendering, on the integrated display on the base, second interactive content for a second region of the second plurality of regions in response to detecting selection of the first dot pattern on the spherical globe. Accordingly, the same first dot pattern can be mapped to the first region in the first plurality of regions in the first mode of operation, and to the second region in the second plurality of regions in the second mode of operation.

According to some embodiments, the method may further include rendering the first interactive content for the first region of the first plurality of regions in response to detecting selection of a second dot pattern on the spherical globe in the first mode of operation, and rendering third interactive content for a third region of the second plurality of regions in response to detecting selection of the second dot pattern on the spherical globe in the second mode of operation. Accordingly, the first and second dot patterns can be mapped to the same first region in the first mode of operation, but the same two dot patterns can be mapped to different regions in the second mode of operation.

DETAILED DESCRIPTION

Figure 1:
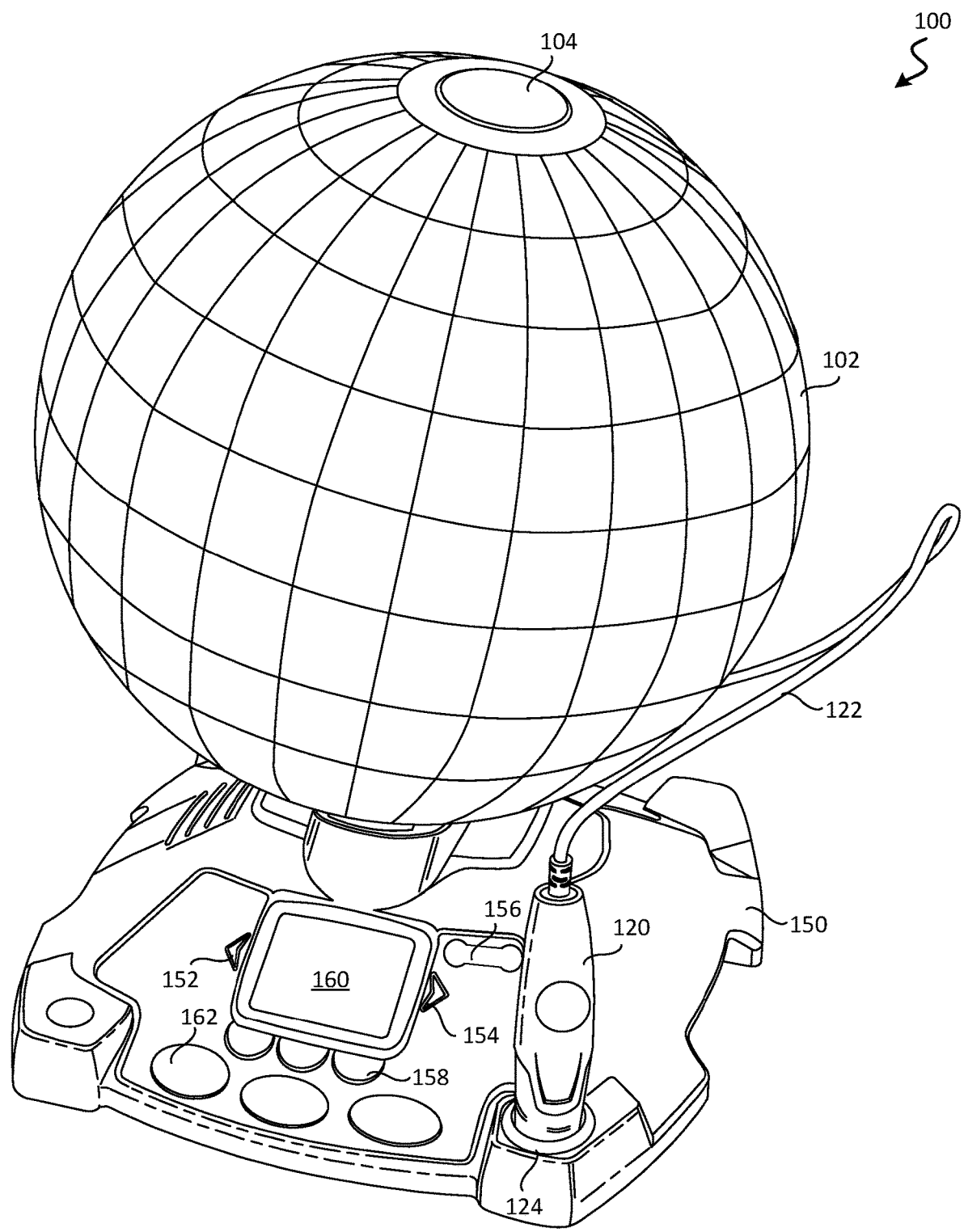
FIG. 1 illustrates an interactive globe device, according to some embodiments.

Techniques for providing a holistic curriculum about our world via an interactive globe apparatus are described. In addition to allowing users to hear facts or sounds of many different facets of the world, the interactive globe device according to some embodiments also allows a user to see content in response to the location a user touches on the globe, including countries, people, animals, landmarks, geological features, art, cuisine, etc. The interactive globe can play video or image files on an integrated display in response to the user's selected location on the globe and the selected category (e.g., countries, animals, etc.). For example, live action footage of whales in the ocean, volcanoes erupting, people bustling on sidewalks in a city, etc. can be shown. The interactive globe can also provide a number of games that expose users to the visual content in different ways. As a result, a much broader curriculum in the context of a globe apparatus can be provided.

In some embodiments, geographical regions defined on the globe can be dynamically remapped according to the mode of operation. For example, when the interactive globe is operating in the countries category mode of operation, different countries on the globe can be considered different regions, and content can be played based on which country a user selects. When the interactive globe is operating in the animals category mode of operation, different regions can be defined based on where a particular species can be found. By way of example, parts of Canada and the northern and coastal parts of the United States can be grouped together into one region where black bears live, and the Arctic and the northern parts of Canada, Russia, and Greenland can be grouped together to form another region where polar bears live. In some embodiments, regions defined within a mode of operation can overlap. For example, the northwest part of the United States and Canada can be grouped together as one region where grizzly bears live, and this region may overlap with the region where black bears live.

To improve the manufacturability of the interactive globe, instead of embedding touch-sensitive capacitive sensors in the globe, microdot patterns can printed onto the globe's spherical surface to facilitate detection of a user's selection of a location on the globe. In some embodiments, each dot pattern printed on the globe's surface can be unique from each other to distinguish each dot pattern. The dot patterns may additionally or alternatively encode position or location information to uniquely identify each dot pattern. A stylus equipped with a camera can be used to capture an image of the dot patterns corresponding to where a user touches the globe with the stylus, and the image can be processed to determine the location on the globe being selected. Depending on the mode of operation, the location on the globe can be mapped to a region defined for that mode of operation, and interactive content corresponding to the selected region can be played. As compared to implementations that embed capacitive touch sensors onto the rotatable spherical surface of the globe, the use of microdot patterns reduces the number of components, costs, and complexity of manufacturing to improve yield and reliability. For example, because sensors are not used on the globe's surface, no electrical connection is required between the spherical globe and the base of the interactive globe device.

FIG. 1 illustrates an interactive globe device 100, according to some embodiments. Interactive globe device 100 may include a base 150 and a spherical globe 102 that is rotatable around an axle 104 mounted to base 150. In some embodiments, axle 104 can be an internal axle that does not require a support arm external to spherical globe 102. In this manner, it is not necessary to connect any support structure at the top end of axle 104 on top of spherical globe 102 as shown, and a smoother rotation can be achieved.

Spherical globe 102 may include an image of the world map printed or otherwise disposed on the globe surface. According to some embodiments, spherical globe 102 may have dot patterns (e.g., microdot patterns) printed throughout the surface of spherical globe 102. The dot patterns can be printed at a small resolution such that the patterns themselves are substantially invisible to the naked eye. For example, each dot pattern can include an arrangement of multiple dots that occupy an area of 2×2 mm or less, 1×1 mm or less, 0.5×0.5 mm or less, etc. In some embodiments, the dot patterns can be printed as an overlay over the world map, and all of the dot patterns can be printed in the same color. For example, the dot patterns can be printed in a black or grey color, and the globe surface may appear to have a grey tint resulting from the black or grey dot patterns. In some embodiments, the dot patterns printed on spherical globe 120 can be printed using multiple colors, and the dot patterns themselves can be used to form the world map image. For example, oceans can be printed as blue dot patterns on the world map, and countries bordering each other can be printed in different color dot patterns to distinguish each country from its neighbors.

Each dot pattern can be used to uniquely identify a location on spherical globe 102. For example, each dot pattern or sequence of dot patterns can have a unique characteristic to distinguish it from other dot patterns or sequences of dot patterns, and a location on spherical globe 102 can be determined by identifying the dot pattern unique to that location. In some embodiments, the dot patterns can have position information (e.g., coordinates, latitude/longitude information, etc.) encoded into the pattern, and a location on spherical globe 102 can be determined by decoding the position information of one or more dot patterns being selected. The use of dot patterns to determine a location on the globe is further described below with reference to FIG. 4.

Base 150 may include an integrated display 160, one or more control buttons, and a power button (not shown). For example, the one or more control buttons may include volume buttons 156, a scroll left or back button 152, a scroll right or forward button 154, a set of general purpose selection buttons 158, and/or a set of game mode buttons 162. Volume buttons 156 can be used to adjust the volume of the content being played. Scroll buttons 152 and 154 may resemble arrows arranged on the left and right sides of integrated display 160. Tapping a scroll button may scroll a list of options being presented on integrated display 160 in the corresponding direction for menus with multiple choices. In some embodiments, scroll buttons 152 and 154 can be deactivated when there isn't a list of options to scroll through. In some embodiments, scroll buttons 152 and 154 can also be used to navigate through interactive content (e.g., repeat, forward, or skip content, etc.). The set of general purpose selection buttons 158 can be positioned beneath integrated display 160 to allow the user to choose from multiple options on the screen. These options may be answer choices, categories, confirmations, or other situations where the user needs to choose an option that is not selectable on spherical globe 102 or by using another control button. The number of general purpose selection buttons 158 can be determined based on the maximum number of options that can be presented on integrated display 160 at a time. Game mode buttons 162 can be used to switch between different types of games or challenges available on interactive globe 100. In some embodiments, base 150 may include a home or exit button, which can be engaged by a user to exit a game or return to the home menu. Base 150 may also include an expansion button to access expansion content that is provided through an external port.

In some embodiments, the one or more control buttons can be implemented as control dot patterns (e.g., microdot patterns) disposed on the surface of base 150 of the interactive globe device 100. The control dot patterns can be printed on base 150, or be printed on one or more stickers or labels that are applied onto base 150. For example, all of the control buttons can be printed on a single label that is shaped according to the contours of base 150. The label may include a cutout for integrated display 160, and may include other decorative images such as animals, buildings, or other themes. Each button or group of buttons can alternatively be printed on separate labels. Unlike the dot patterns on spherical globe 102 which are used to determine position information on a contiguous surface, the control dot patterns are used to determine which control button has been selected or engaged by the user. As such, a control dot pattern printed for a particular control button need not be unique from other dot patterns for that particular control button, and the control dot patterns printed for a particular control button can be implemented using a repetitive control dot pattern. In other words, the control dot patterns that form a particular control button need not be unique from each other, and the same control dot pattern can be used throughout the entire surface of a particular control button.

To distinguish the different functions of the different control buttons, different control button can use different control dot patterns to distinguish each control button from each other. In some embodiments, the arrangement of dots of a control dot pattern printed on a control button can be different from the arrangement of dots of another control button. For example, the left scroll button can be printed with a repeating control dot pattern in the shape of a left arrow, and the right scroll button can be printed with a repeating control do pattern in the shape of a right arrow. In some embodiments, different control buttons may use the same arrangement of dots for the control dot pattern, but the control dot pattern can be printed in different colors to distinguish between different control buttons. In some embodiments, if color is used to distinguish the different control buttons, any arrangement of dots in the control dot pattern can be used.

Interactive globe device 100 may also include a stylus 120. Stylus 120 can be connected to a cord 122 that is attached to base 150 to avoid misplacing stylus 120 and to provide wired communication to base 150. Base 150 may also provide a stylus holder 124 to hold stylus 120 while it is not in use. Stylus 120 may include an optical sensor configured to detect the dot patterns on spherical globe 102 as well as control dot patterns on base 150. In some embodiments, the optical sensor on the stylus may include a camera with sufficient resolution to capture or detect a matrix of dot patterns at a time (e.g., 4×4 matrix of dot patterns, 5×5 matrix of dot patterns, 6×6 matrix of dot patterns, etc.). The matrix of captured dot patterns can be sent to a processor housed inside base 150 for processing. In some embodiments, stylus 120 may also include a light emitter that is configurable to emit colored light. The color light can be used to enhance the contrast of the dot patterns by providing a color filter to filter out colors of the world map, thereby improving the quality of the dot patterns captured by the camera.

In some embodiments, base 150 may also house a battery compartment to provide a power source to interactive globe 100. By using integrated display 160 instead of an external display, integrated display 160 can share the same power supply as other components of interactive globe 100 such as stylus 120. In some embodiments, because capacitive sensors are not used, spherical globe 102 does not need to have and may lack any electrical connection to base 150 of interactive globe 100. This allows the design of axle 104 to be simplified because it is not necessary for axle 104 to house any electrical connections, and it is not necessary to take into account twisting of any electrical cables or wires while spherical globe 102 is being rotated.

Figure 2:
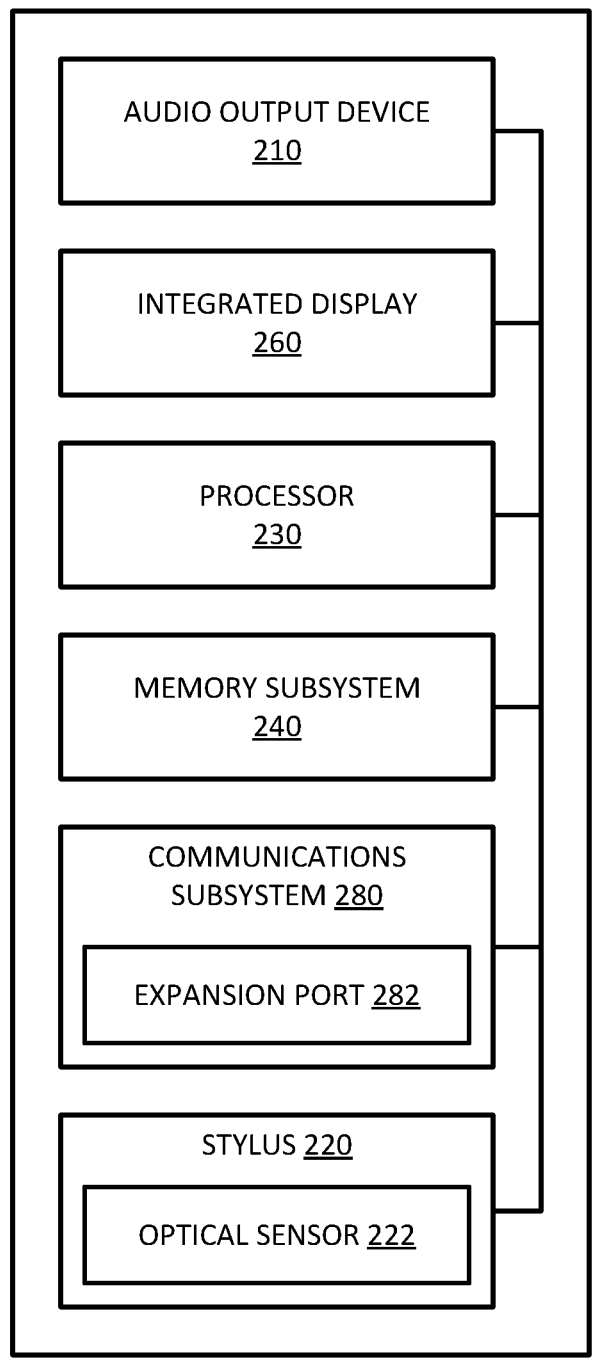
FIG. 2 illustrates a block diagram of an interactive globe device, according to some embodiments.

FIG. 2 illustrates a block diagram of the hardware components of an interactive globe device 200, according to some embodiments. Interactive globe device 200 may include a processor 230, a memory subsystem 240, a communications subsystem 280, an audio output device 210, an integrated display 260, and a stylus 220. Interactive globe device 200 may include a base (e.g., base 150) to house the various hardware components including processor 230, memory subsystem 240, communications subsystem 280, audio output device 210, and integrated display 260. In some embodiments, the base may also provide a stylus holder to hold stylus 220 when stylus 220 is not being used.

Processor 230 can be implemented as one or more integrated circuits, e.g., one or more single core or multicore microprocessors and/or microcontrollers. In operation, processor 230 can control the operation of interactive globe device 200. For example, depending on the mode of operation, processor 230 can retrieve content from memory subsystem 240 in response to user input, and provide the content to be played on integrated display 260 and audio output device 210. In some embodiments, processor 230 can execute a variety of programs in response to program code and can maintain multiple concurrently executing programs or processes. For example, processor 230 can execute different games depending on the operating mode, and provide game saves for the different games concurrently such that a user can return to a particular point in a game after exiting the game. At any given time, some or all of the program code to be executed can be resident in processor 230 and/or in storage media such as memory subsystem 240.

Memory subsystem 720 can be implemented, for example, using semiconductor memories such as DRAM, SRAM, flash memory, or any other non-transitory storage medium, or a combination of media, and can include volatile and/or non-volatile media. In some embodiments, memory subsystem 720 can store an operating system and one or more applications to be executed by processor 230, such as games or other interactive applications. Memory subsystem 720 can also be used to store digital content such as images, videos, and audio clips. In some embodiments, different audio content can be played over the same video at different times depending on the mode of operation.

Communications subsystem 280 may allow interactive globe device 200 to interact with an external device. In some embodiments, communications subsystem may include an expansion port 282 such as a USB port. Expansion port 282 can be used to deliver expansion content packages to interactive globe device 200. For example, an external computing device can be connected to expansion port 282 to download content to interactive globe device 200 via an application installed on the external computing device. Expansion content may include new games, new video and audio content, and/or new categories. In some embodiments, the expansion content can be accessed using a dedicated control button. Expansion port 282 can also be used to provide firmware updates to interactive globe device 200.

Audio output device 210 (e.g., a speaker) may operate in conjunction with integrated display 260 to render interactive content corresponding to a selected region on the globe, depending on the mode of operation. For example, a user may use stylus 220 to touch a particular location on the globe's surface. An optical sensor 222 (e.g., a camera) on the tip of stylus 220 may capture the dot patterns printed on that particular location, and provide an image of the dot patterns to processor 230 for processing. Processor 230 may then determine which location on the globe's surface has been selected by the user, and determine the interactive content corresponding to that location and the current mode of operation to render. In some embodiments, the selected location can be used to determine if a user has correctly answer a challenge to allow a user to advance in a game. When a correct answer is received, video and/or audio content corresponding to the next challenge or stage of the game can be rendered. When an incorrect answer is received, video and/or audio content may instruct the user to try again, give additional clues, and/or impose a penalty for the incorrect answer.

Additional details of operating the interactive globe device will now be described. According to some embodiments, a user may initially power on the interactive globe via a physical button on the base. Thereafter, additional interactions will take place by using the stylus by tapping the dot patterns printed on the spherical surface of the globe and/or by tapping the control dot patterns implementing the control buttons on the base. The interactive globe device can operate in various mode of operations, depending on the gaming mode and/or category being selected. In some embodiments, one of several gaming modes can be selected by engaging one of the game mode buttons provided on the base of the interactive globe device. In some embodiments, a category can be selected by scrolling through different categories provided on the integrated display and selecting a particular category presented on the display using one of the general purpose selection buttons provided on the base below the display. Thus, in some embodiments, the different modes of operation of the interactive globe device can be effected by engaging a game mode button or a general purpose selection button.

In the default mode of operation referred to as Free Play, a user is allowed to freely explore the globe in different categories and see audio and visual representations of the specific region and category. In this mode of operation, different categories can be presented on the integrated display, and a user will be able to scroll left and right through different category options by tapping the left or right scroll buttons. A user can then select a category by tapping the general purpose selection button beneath the desired category icon. Depending on screen size of the integrated display, three or more category icons can be presented on the screen at a time in each page of the categories menu list, and each category icon is positioned above a corresponding general purpose selection button. Examples of categories may include: continents; countries; world capitals; U.S. states and state capitals; rivers, oceans, and seas; mountains, forests, and deserts; culture such as food, music, sports, etc.; animals and habitats; famous landmarks; world languages; geology relating to science of the Earth, land and rock matter, climates, etc.; oddities and fun facts; distance and size; currencies; populations; time and time zones; history; and mix-it-up or random selection.

Depending on the selected category, the dot patterns on the globe surface can be grouped or mapped into different sets of regions. The regions can vary in size and location depending on the category the user is in, and the dot patterns on the globe can be dynamically remapped to different sets of regions in different modes of operation. For example, continents may have large regions defined by the shape of the earth's continents; capitals may have the smallest regions associated with the capital city location/text within each country; and culture may cover small or larger regions depending on the specific content, etc. As such, two dot patterns may correspond to one region in one category, but the same two dot patterns may correspond to two different regions in another category. Each category may have visual (video and/or still images) and audio assets as well as programmatic text that correspond to the regions of the globe. When a location on the globe is selected, the interactive globe device will determine which region in the current mode of operation is selected, and retrieve the appropriate video and audio content to render. In some embodiments, the same video can be played with different audio clips depending on which category the user is in.

A user can also launch various game modes at any time and transition into different guided gameplay experiences by engaging one of the game mode buttons. In some embodiments, if a particular game mode does not support different categories, the category selection feature can be disabled when operating in that game mode. The interactive globe device may provide a set of game mode buttons each corresponding to a type of game that a user can execute on the interactive globe device. For example, three game mode buttons can be provided to allow a user to select between a Quiz Game, Where in the World Game, and an Around the World Game. Tapping on a game mode button can start that corresponding game activity. Tapping a different game mode button while already in a game mode may bring up a confirmation prompt to ensure the user doesn't accidentally exit his/her current game. Within each game mode, the dot patterns on the globe can be dynamically remapped into different sets of regions depending on the current stage or progress in the game, or depending on the challenge question and answer at the particular point in the game. In some embodiments, regions can also be treated differently depending on the game mode and question type.

According to some embodiments, the Quiz Game may allow one or more players to show what they know by tapping the correct location on the globe or on the base to answer questions. Questions can be chosen randomly from different categories at the difficulty level assigned to each player. Answering a question gives points, and the objective is to gather as many points as possible within a predetermined time period.

In some embodiments, the Around the World Game may provide a player with a virtual race around the world for example, by plane, train, ship, hot air balloon, camel, or foot, tec. A player may make his/her way from a chosen starting location through an adventurous route, while answering questions to overcome challenges to progress. Answering incorrectly will result in a time penalty, and the objective is to circle the globe successfully within a predetermined time. Answers to questions can employ a variety of inputs, for example by tapping a location on the globe, or by tapping a general purpose selection button to select an answer from multiple choices presented on the integrated display. If the question presented is answered correctly the player is told where their new destination is and is asked to find the new destination on the globe. The overall length of the journey so far can be communicated regularly to the player during the journey. When the length of the journey in the game reaches a certain number of days, the drama and excitement of these updates may increase.

In some embodiments, the Where in the World Game may provide a player with a role play adventure. For example, the role paly may involve a master thief and a global network of henchmen that are on the loose, and the player is asked to follow clues to capture all of the gang and make the world a safer place. The objective of the game can be to track down the location of a certain character such as a certain city. The player finds the city by gradually homing in on it by answering rounds of a predetermined number of questions. Each round of questions provides a passcode to unlock the next level of information. For example, the first round of questions may lead the player to the continent where the certain character or secret is located in; the second round of questions may lead the player to the country where the certain character or secret is located in; the third round of questions may lead the player to the state or region within a country where the certain character or secret is located in; and the fourth round of questions may lead the player to the city where the certain character or secret is located in.

As mentioned above, the interactive globe device according to some embodiments can define different regions by grouping or mapping different dot patterns to particular regions, and different sets of regions can be defined in different modes of operation. The regions can vary in size and location depending on the game and/or category the user is in. For example, two dot patterns may correspond to one region in one mode of operation, but the same two dot patterns may correspond to two different regions in another mode of operation. Each category may have visual (video and/or still images) and audio assets as well as programmatic text that correspond to the regions of the globe. In some embodiments, different categories can have different sized regions. For example, continents may have large regions defined by the shape of the earth's continents; capitals may have the smallest regions associated with the capital city location/text within each country; and culture may cover small or larger regions depending on the specific content, etc. Regions can also be treated differently depending on the game mode and question type.

Figure 3:
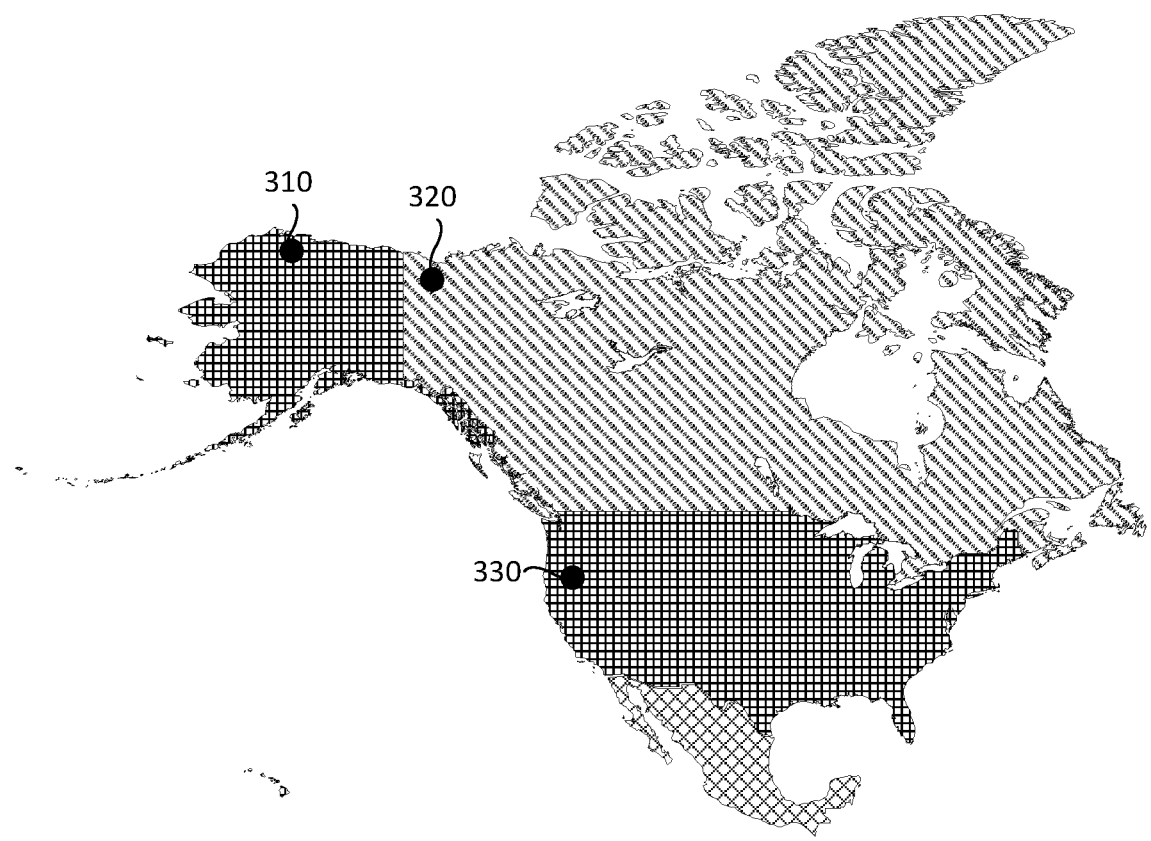
FIG. 3 illustrates a portion of a map, according to some embodiments.

By way of example, FIG. 3 illustrates a map of the North America continent, which can be printed on or disposed on the spherical surface of an interactive globe device, according to some embodiments. Three locations 310, 320, and 330 are highlighted in FIG. 3. Each of these locations may have a unique dot pattern to identify their corresponding location or encode their position on the map. Location 310 may correspond to a location in Alaska of the United States; location 320 may correspond to a location in the Yukon province of Canada, and location 330 may correspond to a location in Oregon of the United States.

According to some embodiments, if the current category is countries or if the current stage or challenge question in the game relates to countries, the dot patterns at locations 310 and 330 can be mapped to a first region corresponding to the United States in the set of regions defining countries, and the dot pattern at location 320 can be mapped to a second region corresponding to Canada in the set of regions defining countries. When the category changes or when a game proceeds to the next question or stage, the mapping of the dot patterns to regions can be dynamically modified. For example, if the category or question type changes to animal habitats, the dot pattern at locations 310 and 320 can be mapped to a first region corresponding to the habitat of polar bears in the set of regions defining bear habitats, and the dot pattern at location 330 can be mapped to a second region corresponding to the habitat of grizzly bears in the set of regions defining bear habitats. As another example, if the category or question type changes to continents, the dot pattern at locations 310, 320, and 330 can be mapped to a first region corresponding to North America in the set of regions defining continents. It should be noted that the dot patterns mapped to the same region need not be contiguous or adjacent to other dot patterns of the same region.

The dot patterns within each region can be used to render interactive content corresponding to the particular region, or can be selected to provide a correct answer to a challenge question. For example, if a user is asked which country has fifty states, selecting either the dot pattern at locations 310 or 330 may provide the correct answer. As another example, in the countries category, selecting either locations 310 or 330 may cause the interactive globe device to render content describing the United States. As a further example, if a user is asked where polar bears live, selecting either the dot patterns at locations 310 or 320 may provide the correct answer. As another example, selecting location 330 in the animal habitat category may cause the interactive globe device to render content relating to grizzly bears.

Figure 4:
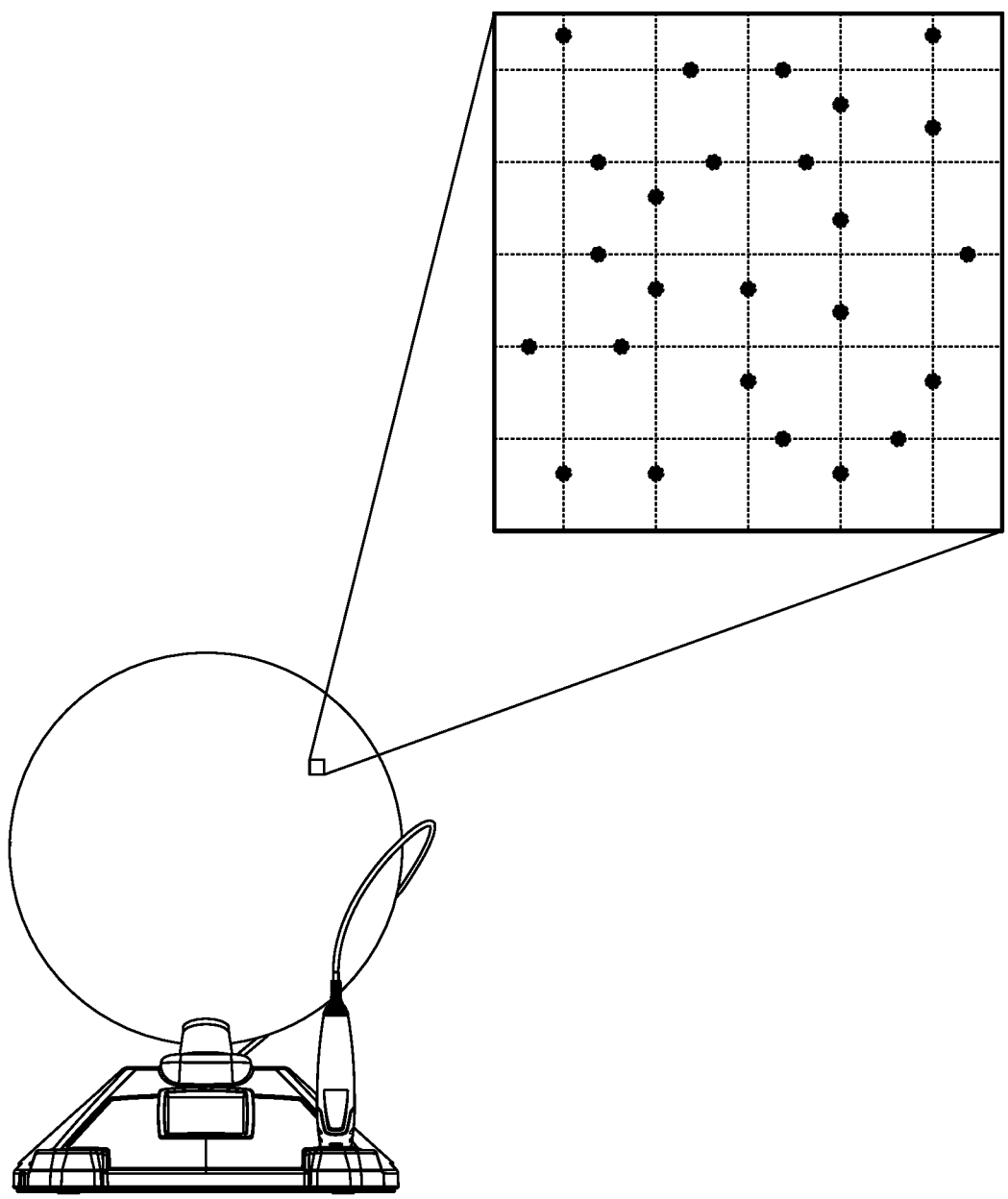
FIG. 4 illustrates an example of a dot pattern, according to some embodiments.

FIG. 4 illustrates an example of a dot pattern disposed on the spherical surface of an interactive globe device, according to some embodiments. The dot pattern of some embodiments can be arranged on virtual raster lines to encode position information. By way of example, the dot pattern shown in FIG. 4 encodes position information using a 5×5 matrix of dots, and each intersection of raster lines has a corresponding dot representing a bit of encoded information. The value of the bit can be determined by the position of the dot relative to the raster line intersection. For example, if the dot is arranged north of an intersection, the value of that bit can be set to 0; if the dot is arranged to the west of the intersection, the value of the bit can be set to 1; if the dot is arranged to the south of the intersection, the value of the bit can be set to 2; and if the dot is arranged to the east of the intersection, the value of the but can be set to 3. Each dot can be arranged at the same predetermined distance from its corresponding intersection. In this manner, the virtual raster lines can be normalized such that each dot is arranged on a raster line to adjust for any offset when capturing the image of the dot pattern.

According to the above bit encoding, starting from the top left corner and moving right on each line, the information encoded in the dot pattern shown in FIG. 3 is:

0-3-3-2-0
3-2-1-1-0
3-2-2-0-3
1-1-2-0-2
2-2-3-2-1.

Converting this to binary notation and concatenating to form a string, the encoded information the becomes:
0011111000111001010011101000110101100010101011 1001.

In some embodiments, this binary string may represent a horizontal coordinate and a vertical coordinate. For example, the first 25 bits may represent a horizontal coordinate value of 8155805, and the last 25 bits may represent a vertical coordinate value of 3508921. Depending on the precision required, each dot pattern can encode using more or fewer number of dots.

In some embodiments, the Earth's latitude and longitude information down to the degree, minutes, or seconds can be encoded in a similar manner. For example, 9 binary bits can be used to encode longitude degree information, 6 binary bits can be used to encode longitude minutes information, 6 binary bits can be used to encode longitude seconds information, 8 binary bits can be used to encode latitude degree information, 6 binary bits can be used to encode latitude minutes information, and 6 binary bits can be used to encode latitude seconds information. Thus, a dot pattern having at least 41 bits can be used to encode geo-coordinate information down to the seconds.

In order to distinguish the start and end of each dot pattern, various techniques can be used. In some embodiments, the dot patterns can be arranged in a recognizable sequence such that no two matrix of dot patterns that can be captured by an optical sensor would appear the same. In some embodiments, dot markers can be used to identify the start and end of a dot pattern. For example, at the start and/or end of each dot pattern or each row and/or column in the dot pattern, an additional dot can be provided at the intersection of the virtual raster lines. The presence of the additional dot can be used to distinguish dots belonging to one pattern from the next. Regarding the control dot patterns used for the control buttons, each control button can be assigned a particular encoded value, and the same dot pattern can be printed throughout the surface of the particular control button.

Figure 5:
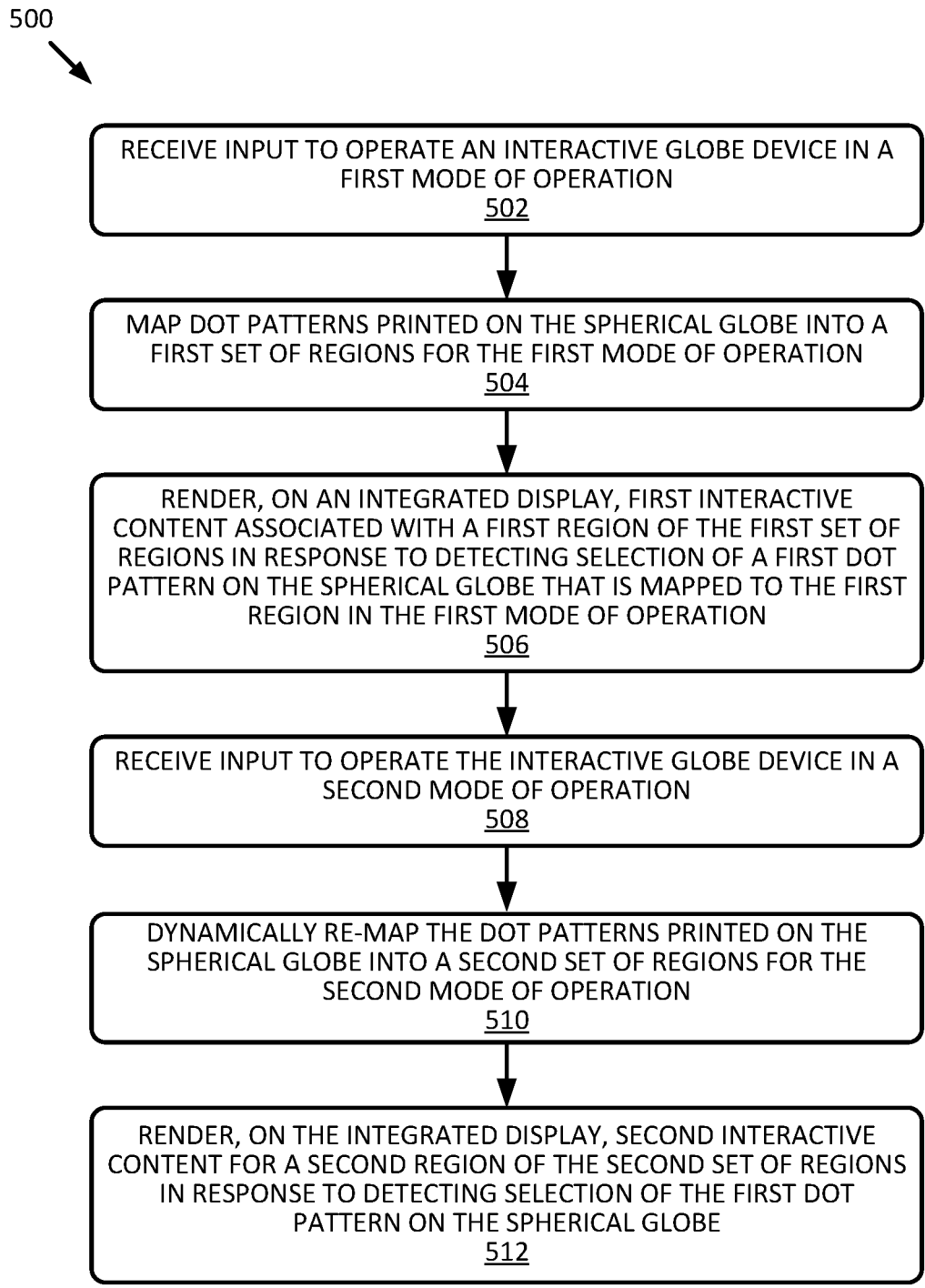
FIG. 5 illustrates a flow diagram of a process for providing interactive content on a globe device, according to some embodiments.

FIG. 5 illustrates a process 500 for rendering content by an interactive globe device, according to some embodiments. The interactive globe device may include a spherical globe rotatable around an axle mounted on a base. The spherical globe may include dot patterns printed thereon, and the base may include an integrated display for rendering interactive content in response to selection of a dot pattern on the spherical globe. The dot pattern can be selected by placing a stylus with an optical sensor in proximity to the dot pattern. An image of the dot pattern can be captured, and the dot pattern can be processed to determine the region that the dot pattern belongs to. Interactive content corresponding to the determined region can be retrieved and rendered on the integrated display. In some embodiments, the mapping of dot patterns into different regions can be dynamically adjusted based on the operating mode of the interactive globe device. According to some embodiments, the interactive globe device may maintain one or more tables of mappings between different modes of operation, dot patterns or range of dot patterns, a set of regions for each mode of operation, and interactive content to render for each region in the particular mode of operation. For example, each mode of operation may include a table that maps dot patterns to regions, and each region may have interactive content associated with the region for that mode of operation.

At block 502, input to operate an interactive globe device in a first mode of operation is received. The input can be received in response to a control button (e.g., a game mode button, a general purpose selection button, a scroll button, an exit or home button, etc.) being engaged on the base of the interactive globe device. In some embodiments, the first mode of operation can be a default mode of operation, and the input to operate in the first mode of operation can be received in response to turning on the interactive globe device.

At block 504, the dot patterns printed on the spherical globe can be mapped into a first set of regions for the first mode of operation. For example, the dot patterns can be mapped into regions corresponding to countries if the first mode of operation corresponds to a country category, or if the first mode of operation corresponds to a challenge or stage in a game involving identifying a country. At block 506, selection of a first dot pattern on the spherical globe can be detected, for example, by placing a stylus with an optical sensor in proximity to the first dot pattern. The first dot pattern can be mapped to a first region of the first set of regions for the first mode of operation, and first interactive content associated with the first region can be rendered in the integrated display in response to detecting selection of the first dot pattern.

At block 506, input to operate an interactive globe device in a second mode of operation is received. The input can be received in response to a control button (e.g., a game mode button, a general purpose selection button, a scroll button, etc.) being engaged on the base of the interactive globe device. At block 508, the dot patterns printed on the spherical globe can be dynamically remapped into a second plurality of regions for the second mode of operation. For example, the dot patterns can be mapped into regions corresponding to cities if the second mode of operation corresponds to a city category, or if the second mode of operation corresponds to a challenge or stage in a game involving identifying a city.

At block 510, selection of the first dot pattern on the spherical globe (e.g., the same dot pattern selected in block 506) can be detected, for example, by placing a stylus with an optical sensor in proximity to the first dot pattern. The first dot pattern can be mapped to a second region of the second set of regions for the second mode of operation, and second interactive content associated with the second region can be rendered in the integrated display in response to detecting selection of the first dot pattern.

In some embodiments, two dot patterns that are mapped to the same region in one mode of operation can be mapped to different regions in another mode of operation. Continuing with process 500 as an example, when the selection of a second dot pattern on the spherical globe is detected in the first mode of operation, if the second dot pattern is also mapped to the first region of the first set of regions, the first interactive content corresponding to the first region can be rendered. In other words, because both the first and second dot patterns are mapped to the same first region in the first mode of operation, selection of either dot pattern may cause the interactive globe to render the same first interactive content. However, when the second dot pattern is selected in the second mode of operation, if the second dot pattern is mapped to a third region in the second set of regions that is different than the second region at block 510, third interactive content corresponding to a third region of the second set of regions can be rendered in response to detecting selection of the second dot pattern in the second mode of operation. In other words, the first and second dot patterns can be mapped to different regions in the second mode of operation even though they are mapped to the same region in the first mode of operation, and different content can be rendered when selecting the two dot patterns in the second mode of operation.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a," "an," or "the" is intended to mean "one or more" unless specifically indicated to the contrary.

What is claimed is:

1. A method comprising:
  receiving input to operate an interactive globe device in a first mode of operation, the interactive globe device having a spherical globe rotatable around an axle mounted on a base;
  mapping dot patterns printed on the spherical globe into a first plurality of regions for the first mode of operation, wherein the dot patterns encode position information comprising horizontal and vertical coordinates on the globe;
  rendering, on an integrated display on the base, first interactive content associated with a first region of the first plurality of regions in response to detecting selection of a first dot pattern on the spherical globe that is mapped to the first region in the first mode of operation;
  receiving input to operate the interactive globe device in a second mode of operation;
  dynamically remapping the dot patterns printed on the spherical globe into a second plurality of regions for the second mode of operation; and
  rendering, on the integrated display on the base, second interactive content for a second region of the second plurality of regions in response to detecting selection of the first dot pattern on the spherical globe, wherein the first dot pattern is mapped to the second region of the second plurality of regions in the second mode of operation.

2. The method of claim 1, further comprising:
rendering the first interactive content for the first region of the first plurality of regions in response to detecting selection of a second dot pattern on the spherical globe in the first mode of operation, wherein the second dot pattern is mapped to the first region of the first plurality of regions in the first mode of operation; and
rendering third interactive content for a third region of the second plurality of regions in response to detecting selection of the second dot pattern on the spherical globe in the second mode of operation, wherein the second dot pattern is mapped to the third region of the second plurality of regions in the second mode of operation.

3. The method of claim 1, wherein the selection of the first dot pattern is detected by a stylus having an optical sensor placed in proximity to the first dot pattern.

4. The method of claim 3, wherein the stylus and the integrated display shares the same power supply.

5. The method of claim 1, wherein the input to operate the interactive globe device in the second mode of operation is received in response to a control button being engaged on the base of the interactive globe device.

6. The method of claim 5, wherein the control button is implemented as a dot pattern button printed on a surface on the base of the interactive globe device.

7. The method of claim 6, wherein the control button is engaged by placing a stylus having an optical sensor in proximity to the dot pattern button.

8. The method of claim 1, wherein the spherical globe lacks an electrical connection to the base of the interactive globe device.

9. The method of claim 1, wherein the dot patterns on the spherical globe encode position information.

10. The method of claim 1, wherein the base includes one or more scroll buttons to control the integrated display.

11. An interactive globe device comprising:
a base including:
an integrated display; and
one or more control buttons for switching an operating mode of the interactive globe device;
a spherical globe rotatable around an axle mounted to the base and having dot patterns printed on a surface of the spherical globe, wherein the dot patterns encode position information comprising horizontal and vertical coordinates on the globe;
a stylus including an optical sensor configured to detect the dot patterns on the spherical globe; and
a processor configured to dynamically adjust mapping of the dot patterns into different regions based on the operating mode of the interactive globe device, determine which of the regions for the operating mode corresponds to a dot pattern detected by the stylus, and render interactive content on the integrated display based on the determined region.

12. The interactive globe device of claim 11, wherein the dot patterns include a first dot pattern and a second dot pattern,
wherein in a first mode of operation, the first dot pattern and the second dot pattern are mapped to the same region, and
wherein in a second mode of operation, the first dot pattern and the second dot pattern are mapped to different regions.

13. The interactive globe device of claim 11, wherein the stylus and the integrated display share the same power supply.

14. The interactive globe device of claim 11, wherein the spherical globe lacks an electrical connection to the base of the interactive globe device.

15. The interactive globe device of claim 11, wherein the one or more control buttons are implemented as one or more control dot pattern buttons printed on a surface on the base of the interactive globe device.

16. The interactive globe device of claim 11, wherein the dot patterns on the spherical globe encode position information.

17. The interactive globe device of claim 11, wherein the base includes one or more scroll buttons to control the integrated display.

18. The interactive globe device of claim 17, wherein the one or more scroll buttons are implemented as one or more control dot pattern buttons printed on a surface on the base of the interactive globe device.

19. The interactive globe device of claim 11, wherein the optical sensor on the stylus is configured to detect a matrix of dot patterns at a time.

20. The interactive globe device of claim 11, wherein the dot patterns printed on the spherical globe are printed in a plurality of colors.

* * * * *